J. S. GILBERT.
Discharge-Plug for Wash-Basins.

No. 219,712. Patented Sept. 16, 1879.

WITNESSES:
Chas. Nida.
C. Sedgwick.

INVENTOR:
J. S. Gilbert
BY Munn & Co.
ATTORNEYS.

UNITED STATES PATENT OFFICE.

JOHN S. GILBERT, OF NEW YORK, N. Y.

IMPROVEMENT IN DISCHARGE-PLUGS FOR WASH-BASINS.

Specification forming part of Letters Patent No. 219,712, dated September 16, 1879; application filed August 4, 1879.

*To all whom it may concern:*

Be it known that I, JOHN S. GILBERT, of the city, county, and State of New York, have invented a new and useful Improvement in Discharge-Plugs for Wash-Basins, of which the following is a specification.

Figure 1:
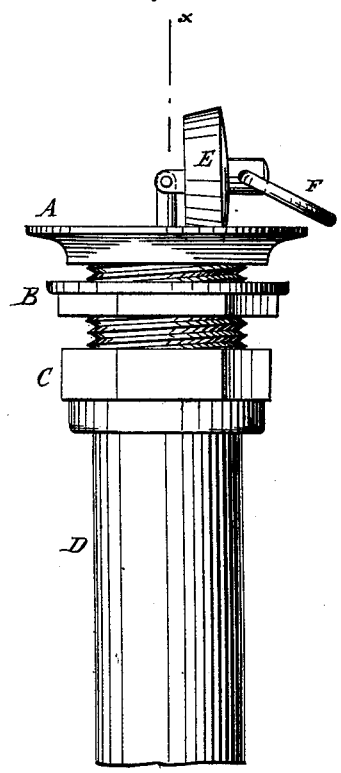
Figure 2:
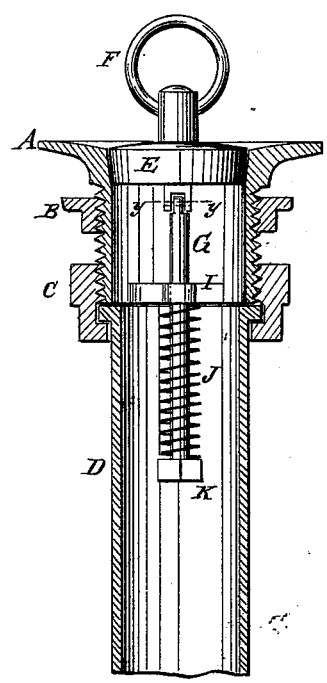
Figure 3:
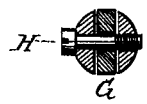

Figure 1 is a side view of a discharge-plug and its socket, shown as applied to the end of the waste-pipe. Fig. 2 is a vertical section of the same, taken through the line $x\,x$, Fig. 1. Fig. 3 is a detail section of the same, taken through the line $y\,y$, Fig. 2.

Similar letters of reference indicate corresponding parts.

The object of this invention is to furnish discharge-plugs for wash-basins, bath-tubs, and other receptacles of water connected with a waste or discharge pipe leading to a sewer or other receiver, and which shall be so constructed that they may be tilted to allow obstructions to be removed from the upper ends of the discharge-pipes, and may be detached to allow the pipe of a suction or force pump to be inserted for removing obstructions lodged farther down.

The invention consists in a discharge-plug connected with its guide-stem within the discharge-socket detachably by a hinge, as hereinafter fully described.

A represents the discharge-socket. B is the nut by which it is secured to a wash-basin or other vessel, and C is the coupling by which it is connected with the waste or discharge pipe D, about the construction of which parts there is nothing new. E is the plug, which fits water-tight into the mouth of the socket A, and is provided with a ring, F, to serve as a handle for inserting and removing it.

Upon the center of the lower side of the plug E is formed a short stud, the end of which is hinged to the upper end of the guide-stem G detachably by a screw, H. The stem G passes down through a hole in the center of the frame or spider I, formed in or attached to the lower end of the socket A, to prevent coarse substances from passing down into the waste-pipe.

Upon the lower part of the guide-stem G is placed a spiral spring, J, the upper end of which rests against the frame I, and its lower end rests upon a nut or head, K, attached to or formed upon the lower end of the said guide-stem G.

With this construction the plug E can be raised out of the socket A and tilted or turned to one side, as shown in Fig. 1, to allow obstructions that may lodge upon the frame I to be removed; and by taking out the screw H the plug E may be detached to allow the tube of a pump to be inserted in the socket A for the removal of obstructions that may have lodged in the waste-pipe.

Having thus described my invention, I claim as new and desire to secure by Letters Patent—

A discharge-plug, E, connected with the guide-stem G within the socket A detachably by a hinge, substantially as herein shown and described.

JOHN S. GILBERT.

Witnesses:
 JAMES T. GRAHAM,
 C. SEDGWICK.